INVENTORS
Thomas Wirth
Wilhelm Ellermann
Kurt Hartmann
by
ATTORNEY

INVENTORS
Thomas Wirth
Wilhelm Ellermann
Kurt Hartmann by

ATTORNEY

United States Patent Office 3,143,767
Patented Aug. 11, 1964

3,143,767
MULTIPLE SCREW MIXING AND EXTRUSION APPARATUS
Thomas Wirth, Dachau, Munich, and Wilhelm Ellermann and Kurt Hartmann, Munich, Germany, assignors to Krauss - Maffei Aktiengesellschaft, Munich - Allach, Germany
Filed July 6, 1961, Ser. No. 122,200
7 Claims. (Cl. 18—12)

This invention relates to new and useful improvements in extrusion apparatus and is concerned more particularly with screw conveyor devices for continuously mixing and kneading solid, viscous or plastic material.

In extrusion apparatus which incorporates screw conveyor devices of this type the portions of the screw conveyor devices which extend forwardly of the conically reduced portions are of substantially smaller diameter than the screw conveyor portions arranged inwardly of the conically reduced screw conveyor portions, and are enclosed by a common housing jacket.

In view of the provision of a single housing for these diametrically smaller screw conveyor portions the space between these portions is therefore much larger than the space between the inner portions of the screw conveyor devices having a larger diameter. Consequently the pressure of the extrusion material in this larger space is substantially smaller than in the space between the inner screw conveyor portions so that the extrusion material in the large space is backed up because of the extrusion pressure at the discharge end of the extrusion apparatus so that the extrusion pressure of the apparatus is reduced. The existence of the larger disproportionate space created between the forward portions of the screw conveyor devices results also in an uneven distribution of the material treated in the screw conveyor casing or barrel which in turn creates uneven temperatures in the extrusion material in view of the fact that the heating and cooling media are able to affect the extrusion material only along the peripheral areas of the screw conveyor devices because they have a common conveyor casing. The resulting extrusion material which is discharged at the extrusion dies or nozzles is of uneven temperature and possesses therefore unequal physical properties.

The aforementioned disadvantages are eliminated according to the invention in that the portions of the screw conveyor devices arranged in the direction of movement of the work material forwardly of the conically reduced intermediate portions of the screw conveyor devices are each surrounded by an individual casing or barrel and each is provided with cooling ribs which are contacted by a cooling fluid and are provided with heating means disposed over the cooling ribs.

With the arrangement according to the invention the desired improved temperature conditions are obtained and the conveying effect of the mixing and kneading apparatus is increased because the separate arrangement of the forward portions of the screw conveyor devices in individual barrels also obviates a backing-up of the extrusion material. The temperatures that are most suitable for the extrusion material may be set and maintained in a more exact and more dependable manner because the separate individual barrels may be surrounded over the entire periphery of the barrels by suitable cooling and heating means.

It is therefore an object of this invention to provide an improved extrusion apparatus in which the reduced forward portions of the screw conveyor devices are each enclosed in a separate individual casing.

It is another object of this invention to provide a novel extrusion apparatus in which the temperature of the extrusion material may be set and maintained at uniformly precise temperatures.

It is a further object of this invention to provide a novel extrusion apparatus in which the conveyance of the material is accomplished in a more efficient and continuous manner.

These and other objects of the invention will become apparent from the following description when read in conjunction with the accompanying drawings in which.

Corresponding reference characters indicate corresponding parts throughout the several views of the drawing.

Figure 1:
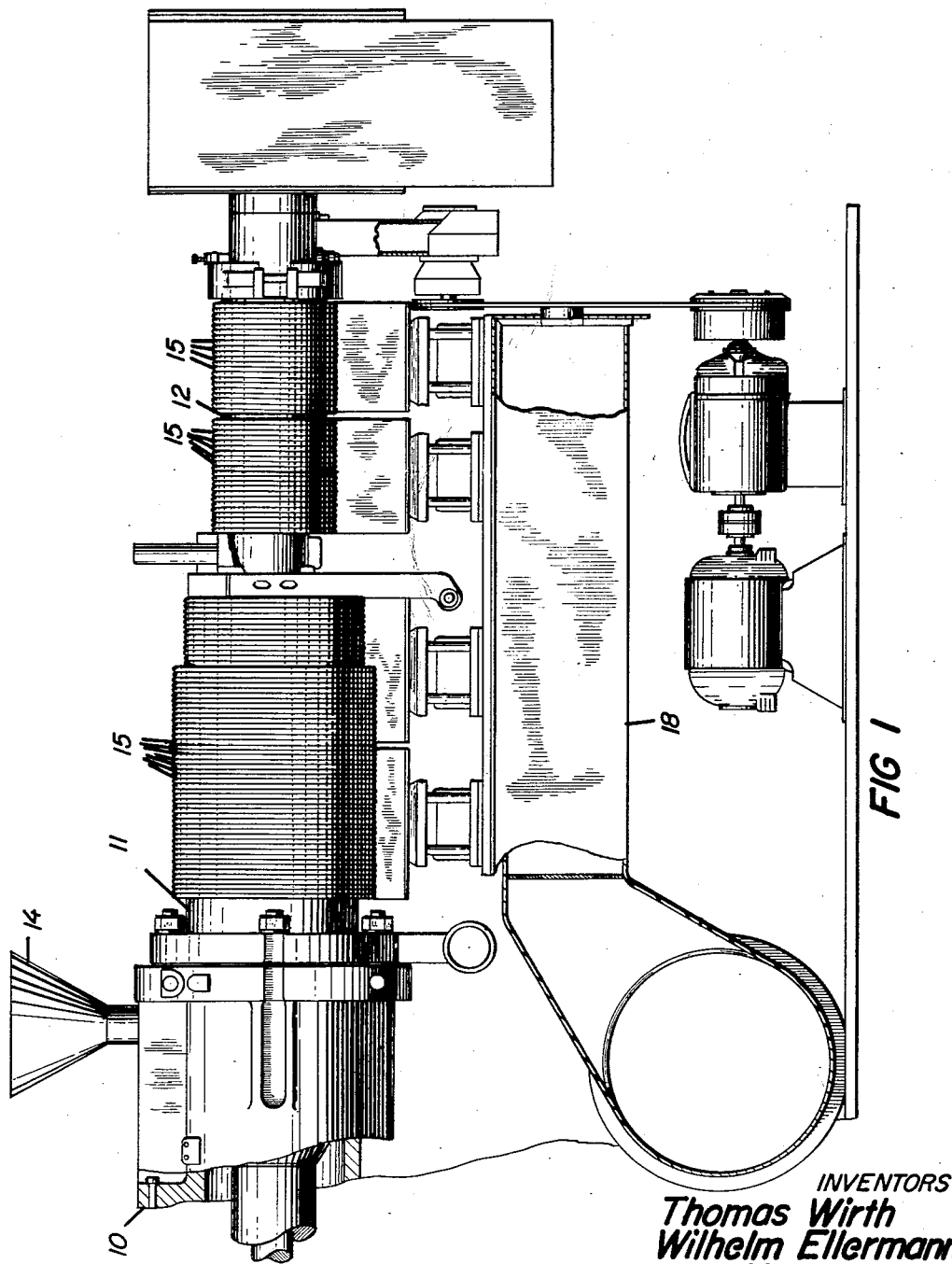
FIG. 1 is a side elevation of an embodiment of the extrusion apparatus according to the invention with portions of the housing broken away to illustrate specific elements of the apparatus in elevation.

Referring now particularly to FIG. 1 of the drawing reference numeral 10 designates the frame or housing of the extrusion apparatus according to the invention. Reference numeral 11 designates the common casing for the interacting inner screw conveyor portions of the screw conveyor devices and reference numeral 12 designates one of the two individual casings enclosing the diametrically reduced forward or outer portion of one of the two screw conveyor devices. As shown in the drawing each of the casings 11 and 12 are provided with peripherally extending cooling ribs 13 which are suitably formed by cutting radial grooves into the casing surface. The material to be treated in the extrusion apparatus may be introduced through a feed hopper 14. As shown more particularly in FIG. 2 of the drawing, heating elements 15 which preferably consist of heating coils are mounted on each of the screw conveyor casings 11 and 12. The cooling of the screw conveyor casings 11 and 12 may be effected by an air circulating system, including an air tank 18. Each of the screw conveyor casings 11 and 12 may be subdivided into different cooling sections communicating with the air tank. The specific heating and cooling arrangement preferably employed with this novel mixing and extrusion apparatus is described and illustrated in copending application Serial No. 127,731, filed July 28, 1961, in the name of Gerd von Bennigsen, and entitled "Extrusion Machine."

Figure 2:
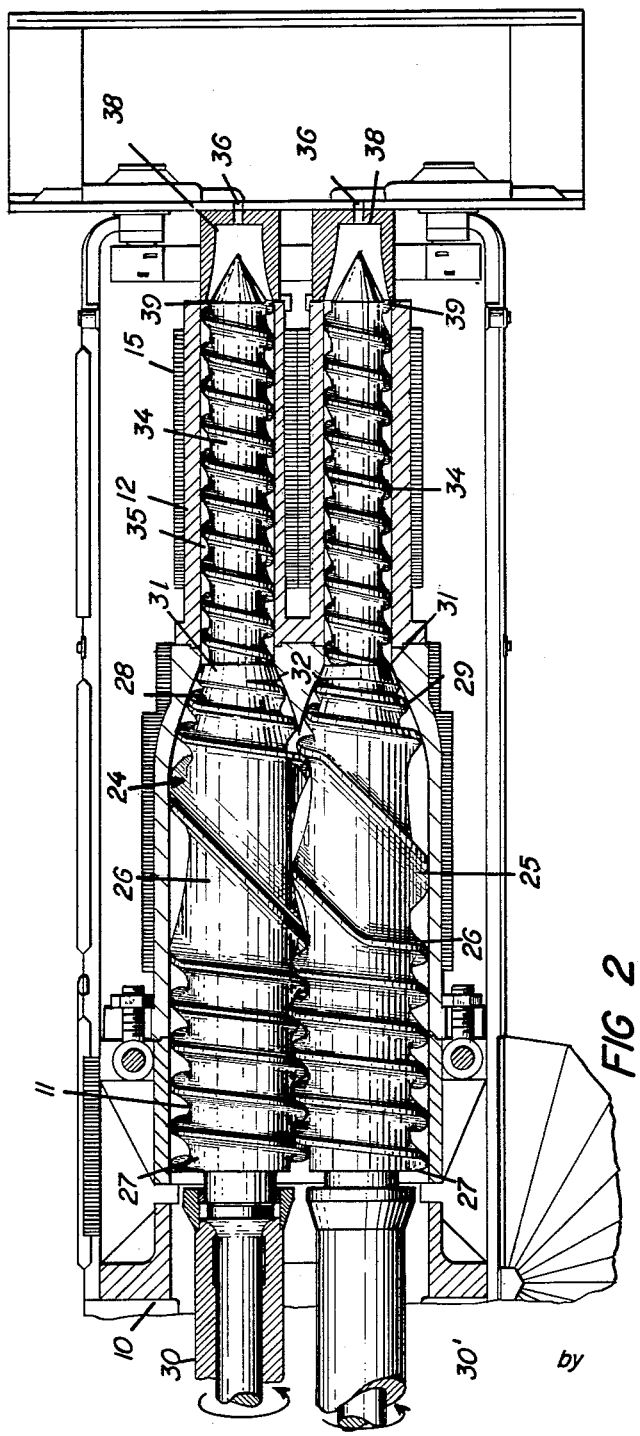
FIG. 2 is a plan view of the apparatus of FIG. 1 with the upper portion of the housing cut away.

Referring now more particularly to FIG. 2 of the drawing, numerals 24 and 25 designate two cylindrical screw conveyor devices. Each of these conveyor devices has an external conveying worm thread 26 along its outer surface. The rear or inner portions 27 of the two screw conveyor devices 24 and 25 are positioned in the common casing 11 side by side substantially parallel to each other with their external conveying worm threads meshing with each other. The screw conveyor devices are operated by a suitable power source connected through conventional shaft and gear means to the screw conveyor devices at 30 and 30'. The screw conveyor devices are rotated in the same direction as indicated by the arrows in the drawing. The inner portions 27 of the screw conveyor devices are first provided with closely pitched conveyor screw threads which receive the material introduced through the feed hopper 14. Following the closely pitched screw thread portions is a section of a substantially longer pitch which constitutes the mixing and kneading section of the screw conveyor devices in which the work material is plasticized and wherein filler material, softening agents or coloring agents and the like are uniformly intermixed. The kneading effect of this portion of the screw conveyor devices produces also a compression and condensing of the work material which enhances the thermal conductivity through the mass. Following the screw conveyor portion of greater pitch length are conically reduced portions 28 and 29 of the screw conveyor devices which have again a relatively closely pitched screw thread. The conically reduced portions 28 and 29 form at their forward end 31 a constricted portion which may be adjusted by an axial sliding of the screw conveyor devices to provide a more or less restricted passage 32 whereby the length of time that the work material remains in the mixing and kneading space 33 of the screw conveyor may be varied. Forwardly of the conically reduced conveyor portions are the screw conveyor portions 34 whose outer diameter is approximately the same as the root diameter at the forward end 29 of the conically reduced portion. From this description it will be observed that the diameter of the inner portion of the screw conveyor devices is larger than the diameter of the outer screw conveyor devices. The root diameter of the outer portions of the screw conveyor devices increases toward the outlet end of the extrusion apparatus, so that the circumferential space 35 between these screw conveyor portions and their casings are decreasing. This causes an additional compressing or condensing of the work material so that the extrusion pressure in the nozzles 36 of the extrusion heads 38 connected to the ends 39 of the screw conveyor devices is increased.

What is claimed is:

1. An extrusion apparatus comprising in combination a plurality of adjacent screw conveyer shafts, said screw conveyer shafts having each an inner screw conveyer portion and an outer screw conveyer portion,
said inner screw conveyer portion having a larger diameter than said outer screw conveyer portion,
common casing means for said inner screw conveyer portions,
separate casing means for said outer screw conveyer portions,
said separate casing means extending in spaced relationship over at least a portion of their axial length to provide a space between adjacent separate casing means,
and individual heating and cooling means on each said separate casing means and partly disposed in the space between adjacent separate casing means.

2. An extrusion apparatus comprising in combination a plurality of adjacent cooperating screw conveyer shafts,
said screw conveyer shafts having each an inner portion of relatively large diameter,
a conical intermediate portion of a diameter decreasing away from said inner portion,
and an outer portion of relatively small diameter,
common casing means for said inner portions and said intermediate portions of said screw conveyer shafts,
separate adjacent casing means for said outer portions of said screw conveyer shafts and spaced from each other at least partly along their axial extent to provide a space between each other,
said separate casing means having cylindrical bores closely surrounding said outer screw conveyer portions,
individual outlet means for each casing at the end of said screw conveyer shafts,
and individual heating and cooling means on each said separate casing means and passing through said space between said separate casing means.

3. An extrusion apparatus comprising in combination a plurality of adjacent cooperating screw conveyer shafts,
said screw conveyer shafts having each an inner portion of relatively large diameter,
a conical intermediate portion of a diameter decreasing away from said inner portion,
and an outer portion of relatively small diameter,
common casing means for said inner portions and said intermediate portions of said screw conveyer shafts,
separate adjacent casing means for said outer portions of said screw conveyer shafts and spaced from each other at least partly along their axial extent to provide a space between each other,
said separate casing means having cylindrical bores closely surrounding said outer screw conveyer portions,
individual outlet means for each casing at the end of said screw conveyer shafts,
the root diameter of said outer portions increasing toward said outlet means of each casing to reduce the space in said bores toward said outlet means,
and individual heating and cooling means on each said separate casing means and passing through said space between said separate casing means.

4. The extrusion apparatus according to claim 3 wherein said screw conveyer shafts are axially adjustable to vary the spacing of said intermediate conical portions and said outer portions relative to the inner surface of their casings.

5. An extrusion apparatus comprising in combination a plurality of adjacent cooperating screw conveyer shafts,
said screw conveyer shafts having an inner portion of relatively large diameter,
a conical intermediate portion of a diameter decreasing away from said inner portion,
and an outer portion of relatively small diameter,
a common casing for said inner portions and said intermediate portions of said screw conveyer shafts,
separate adjacent casings for said outer portions of said screw conveyer shafts and extending freely forwardly substantially from the outer end of said intermediate conical portions to provide a space between adjacent casings,
individual outlet means for each casing at the end of said screw conveyer shafts,
the root diameter of said outer portions increasing gradually toward said outlet means of each casing to reduce the space between said outer screw conveyer portions and the inner surface of said separate casings,
cooling ribs on said common casing and on each said separate casings,
said cooling ribs defining intermediate cooling grooves,
individual heating means disposed on said cooling ribs on said common casing and on each said separate casings,
said cooling ribs and said individual heating means surrounding said separate casings and passing through said space between adjacent separate casings,
and means for drawing air through said cooling grooves.

6. An extrusion apparatus comprising in combination, a plurality of adjacent screw conveyor shafts,
said screw conveyer shafts having each an inner screw conveyer portion of relatively large diameter,
a conical intermediate screw conveyer portion of a diameter decreasing away from said inner portion,
and an outer screw conveyer portion of relatively small diameter,
a common casing for said inner portions and said intermediate portions,
said common casing enclosing said inner portions and said intermediate portions in close proximity,
said common casing having an integral outer end wall portion having openings conforming with said intermediate conical portions,
separate casings for each of said outer portions and defining a gap between adjacent separate casings at least along a portion of their axial length,
said separate casings having interconnecting wall means at their inner end connected to the center portion of said outer end wall of said common casing,
separate outlet means for each of said separate casings at the end of said screw shafts, said outer portions having a diameter increasing toward said outlets, and means for selectively heating and cooling at last said separate casings and located at least partly in said gap.

7. An extrusion apparatus according to claim 6 wherein screw threads are provided on said conical intermediate screw conveyor portion.

References Cited in the file of this patent

UNITED STATES PATENTS

| | | |
|---|---|---|
| Re. 23,948 | Fuller | Feb. 15, 1955 |
| 806,502 | Rutschman | Dec. 5, 1905 |
| 2,494,891 | Marshall | Jan. 17, 1950 |
| 2,693,348 | Ellermann | Nov. 2, 1954 |
| 2,774,107 | Davis | Dec. 18, 1956 |
| 2,802,238 | Colombo | Aug. 13, 1957 |
| 2,942,294 | Reifenhauser | June 28, 1960 |
| 2,946,089 | Heston | July 26, 1960 |

FOREIGN PATENTS

| | | |
|---|---|---|
| 962,746 | Germany | Apr. 11, 1957 |
| 828,083 | Great Britain | Feb. 17, 1960 |
| 486,870 | Italy | Nov. 18, 1953 |